(12) United States Patent
Yukawa

(10) Patent No.: US 9,783,008 B2
(45) Date of Patent: Oct. 10, 2017

(54) PNEUMATIC TIRE

(71) Applicant: SUMITOMO RUBBER INDUSTRIES LTD., Kobe-shi (JP)

(72) Inventor: Naoki Yukawa, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 539 days.

(21) Appl. No.: 14/473,030

(22) Filed: Aug. 29, 2014

(65) Prior Publication Data
US 2015/0083299 A1    Mar. 26, 2015

(30) Foreign Application Priority Data

Sep. 26, 2013 (JP) ................. 2013-200559

(51) Int. Cl.
*B60C 15/06* (2006.01)
*B60C 17/00* (2006.01)
(Continued)

(52) U.S. Cl.
CPC .......... *B60C 17/0009* (2013.01); *B60C 5/142* (2013.01); *B60C 15/0027* (2013.01);
(Continued)

(58) Field of Classification Search
CPC . B60C 15/0607; B60C 15/027; B60C 15/036; B60C 15/0027; B60C 15/0036;
(Continued)

(56) References Cited

U.S. PATENT DOCUMENTS 4,139,040 A * 2/1979 Samoto ................... B60C 15/06
                                                                152/541
4,235,273 A * 11/1980 Edwards ................. B60C 13/00
                                                                152/454

(Continued)

FOREIGN PATENT DOCUMENTS

EP    1 024 033 A2    8/2000
EP    1 024 033 A3    8/2000

(Continued)

OTHER PUBLICATIONS

English machine translation of JP2013-147092, no date.*

(Continued)

*Primary Examiner* — Robert Dye
(74) *Attorney, Agent, or Firm* — Oblon, McClelland, Maier & Neustadt, L.L.P.

(57) ABSTRACT

A pneumatic tire includes a tread, sidewalls extending from edges of the tread, clinches extending from the edges of the sidewall, beads positioned on axially inner side of the clinches, a carcass bridging the beads along inner side of the tread and sidewalls, and load support layers positioned on axially inner side of the carcass such that the layers are positioned between the tread and beads. Each bead includes core and main apex, the core has radially outer side surface facing radially outward, the carcass includes carcass ply turned up around the core from inner side toward outer side in axial direction of the tire such that the main portion and turn-up portion are formed in the ply, the turn-up portion has core laminating portion laminated on the radially outer side surface of the core, and the apex is extending radially outward from radially outer side of the laminating portion.

20 Claims, 6 Drawing Sheets

(51) Int. Cl.
  *B60C 15/00* (2006.01)
  *B60C 5/14* (2006.01)
(52) U.S. Cl.
  CPC ...... *B60C 15/0054* (2013.01); *B60C 15/0607* (2013.01); *B60C 2015/0614* (2013.01); *B60C 2017/0063* (2013.01)
(58) Field of Classification Search
  CPC ................ B60C 15/06; B60C 15/0054; B60C 2015/0614
  See application file for complete search history.

(56) References Cited

U.S. PATENT DOCUMENTS

| | | | |
|---|---|---|---|
| 6,530,411 | B1 | 3/2003 | Tsukagoshi et al. |
| 7,523,774 | B2 * | 4/2009 | Lahure .................. B60C 15/06 152/539 |
| 2003/0141001 | A1 | 7/2003 | Tsukagoshi et al. |
| 2004/0084126 | A1 | 5/2004 | Tsukagoshi et al. |
| 2005/0081976 | A1 | 4/2005 | Maruoka et al. |
| 2007/0113955 | A1 | 5/2007 | Tsukagoshi et al. |
| 2010/0132866 | A1 * | 6/2010 | Imoto ...................... C08K 7/06 152/517 |

FOREIGN PATENT DOCUMENTS

| | | | |
|---|---|---|---|
| JP | 2000-219016 | A | 8/2000 |
| JP | 3312880 | B | 5/2002 |
| JP | 2008-1201 | A | 1/2008 |
| JP | 2013-28300 | A | 2/2013 |
| JP | 2013-147092 | * | 8/2013 |

OTHER PUBLICATIONS

Extended European Search Report issued Jul. 21, 2015 in Patent Application No. 14180937.6.
Partial European Search Report issued Jan. 30, 2015 in Patent Application No. 14180937.6.

* cited by examiner

PNEUMATIC TIRE

CROSS-REFERENCE TO RELATED APPLICATIONS

The present application is based upon and claims the benefit of priority to Japanese Patent Application No. 2013-200559, filed Sep. 26, 2013, the entire contents of which are incorporated herein by reference.

BACKGROUND OF THE INVENTION

Field of the Invention

The present invention relates to a pneumatic tire, more specifically, to a runflat tire having a load support layer in the sidewall.

Description of Background Art

JP 2013-28300 A describes a runflat tire in which the turn-up portion of the carcass ply overlaps the belt. The carcass has a so-called "super-high turn-up structure." The tire is capable of running for a longer period of time even when deflated. Japanese patent publication 3312880 describes a tire provided with a reinforcing filler layer between the axially outer side of the bead apex and the carcass ply. The entire contents of these publications are incorporated herein by reference.

SUMMARY OF THE INVENTION

According to one aspect of the present invention, a pneumatic tire includes a tread, sidewalls extending from edges of the tread substantially inward in a radial direction of the pneumatic tire, respectively, clinches extending from edges of the sidewall substantially inward in the radial direction, respectively, beads positioned on an axially inner side of the clinches, respectively, a carcass bridging the beads along an inner side of the tread and sidewalls, and load support layers positioned on an axially inner side of the carcass such that the load support layers are positioned between the tread and the beads. Each of the beads includes a core and a main apex, the core has a radially outer side surface facing radially outward, the carcass includes a carcass ply which is turned up around the core from an inner side toward an outer side in an axial direction of the pneumatic tire such that the main portion and a turn-up portion are formed in the carcass ply, the turn-up portion has a core laminating portion laminated on the radially outer side surface of the core, and the main apex is extending radially outward from a radially outer side of the core laminating portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
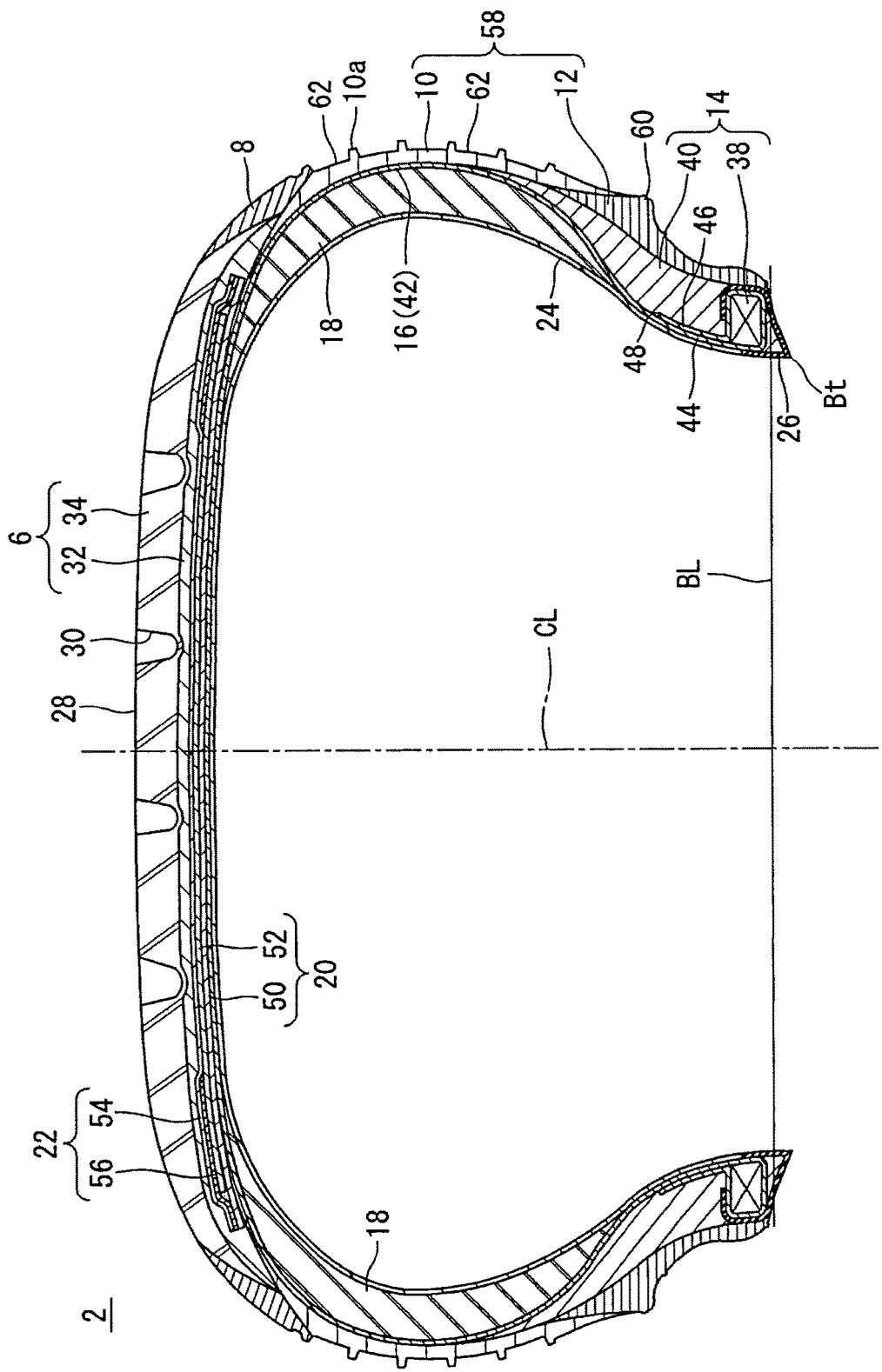
FIG. 1 is a cross-sectional view showing a pneumatic tire according to an embodiment of the present invention.

The embodiments will now be described with reference to the accompanying drawings, wherein like reference numerals designate corresponding or identical elements throughout the various drawings.

FIG. 1 shows pneumatic tire 2. With respect to the drawing sheet in FIG. 1, the direction perpendicular to the sheet is a circumferential direction of tire 2, a direction to the right or left is an axial direction of tire 2, and a direction toward the upper or lower portion is a radial direction of tire 2. A dashed line (CL) in FIG. 1 indicates the equatorial plane of tire 2. Straight line (BL) indicates the bead base line. Except for the tread pattern, the shape of tire 2 is symmetrical at equatorial plane (CL). Bead base line (BL) is a straight line that passes through the bead diameter position and extends in the axial direction of tire 2 as regulated by the standards on which tire 2 is based.

Tire 2 is provided with tread 6, wing 8, sidewall 10, clinch 12, bead 14, carcass 16, load support layer 18, belt 20, band 22, inner liner 24 and chafer 26. Tire 2 is a tubeless type. Tire 2 is for mounting on a passenger car.

Tread 6 is shaped to be convex in a radially outward direction. Tread 6 forms tread surface 28 to be in contact with the road surface. Groove 30 is formed on tread surface 28. The tread pattern is formed by groove 30. Tread 6 has base layer 32 and cap layer 34. Cap layer 34 is positioned on the radially outer side of base layer 32. Cap layer 34 is laminated on base layer 32. Base layer 32 is made of a crosslinked rubber with excellent adhesiveness. The typical rubber material for base layer 32 is natural rubber. Cap layer 34 is made of a crosslinked rubber with excellent wear resistance, heat resistance and grip performance.

Wing 8 is positioned between tread 6 and sidewall 10. Wing 8 is bonded with both tread 6 and sidewall 10. Wing 8 is made of a crosslinked rubber with excellent adhesiveness.

Sidewall 10 extends from an edge of tread 6 substantially inward in a radial direction. The radially outer edge of sidewall 10 is bonded with tread 6 and wing 8. The radially inner edge of sidewall 10 is bonded with clinch 12. Sidewall 10 is made of a crosslinked rubber with excellent cut resistance and weather resistance. Sidewall 10 is positioned on the axially outer side of carcass 16. Sidewall 10 prevents damage to carcass 16.

Clinch 12 is positioned substantially on the inner side of sidewall 10 in a radial direction. Clinch 12 is positioned on the axially outer side of bead 14 and carcass 16. Clinch 12 is made of a crosslinked rubber with excellent wear resistance. Clinch 12 makes contact with the rim flange.

Bead 14 is positioned on the radially inner side of sidewall 10. Bead 14 is positioned on the axially inner side of clinch 12. Bead 14 is provided with core 38 and apex 40 that extends radially outward. Apex 40 tapers radially outward. Apex 40 is made of a crosslinked rubber with high hardness.

Core 38 is shaped in a ring and includes a wound non-stretchable wire (typically a steel wire). On a cross section of core 38, multiple non-stretchable wires are axially arrayed at substantially even intervals, while being radially arrayed at substantially even intervals as well. Those non-stretchable wires are covered with coating rubber. The cross-sectional shape of core 38 is substantially rectangular. Bead 14 has a strand-bead structure. The strand-bead structure includes a single-wire bead structure that has a core formed by winding a single non-stretchable wire.

Figure 2:
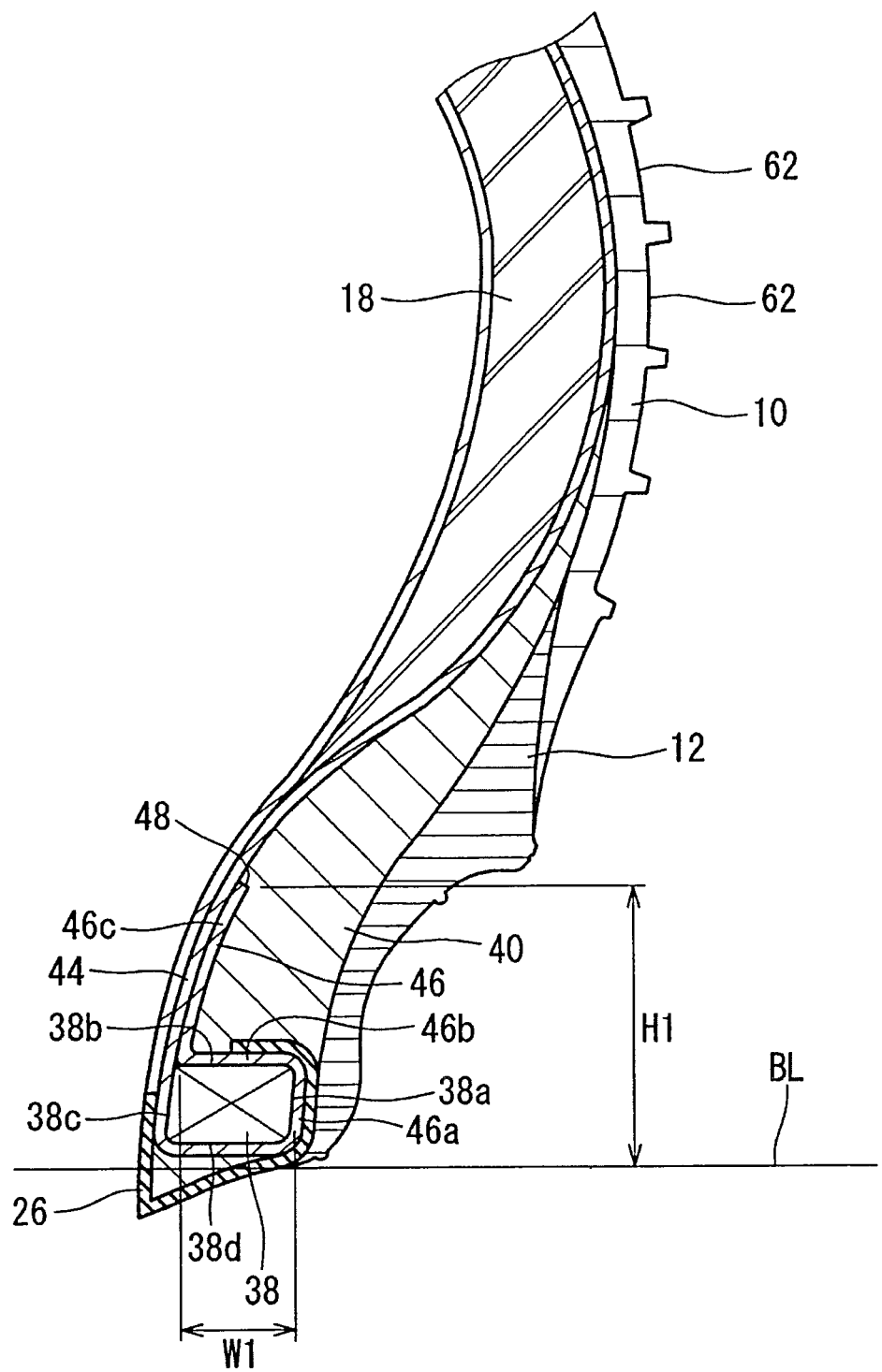
FIG. 2 is an enlarged view showing part of the tire in FIG. 1.

As shown in FIG. 2, core 38 has axially outer side surface (38*a*) facing axially outward, radially outer side surface (38*b*) facing radially outward, axially inner-side surface (38*c*) facing axially inward, and radially inner side surface (38*d*) facing radially inward. Axially outer side surface (38*a*) is substantially perpendicular to radially outer side surface (38*b*).

Carcass 16 in FIG. 1 is formed with carcass ply 42. Carcass ply 42 bridges beads 14 on both sides. Carcass ply 42 is arrayed along tread 6 and sidewall 10. Carcass ply 42 is turned around core 38 from the inner side toward the outer side in an axial direction. Because of such a turn-up structure, main portion 44 and turn-up portion 46 are formed in carcass ply 42.

As shown in FIG. 2, turn-up portion 46 is turned up around core 38 while being laminated from radially inner side surface (38*d*) to axially outer side surface (38*a*). Turn-up portion 46 includes core side portion (46*a*), core laminating portion (46*b*) and ply laminating portion (46*c*). Core side portion (46*a*) is laminated on axially outer side surface (38*a*) of core 38. Core laminating portion (46*b*) extends to be contiguous from core side portion (46*a*) and is laminated on radially outer side surface (38*b*) of core 38. Ply laminating portion (46*c*) extends to be contiguous from core laminating portion (46*b*) and is laminated on main portion 44. Edge 48 on the radially outer side of turn-up portion 46 is laminated on main portion 44. Carcass ply 42 is formed so that the outer circumferential surface of core 38 is surrounded by main portion 44 and turn-up portion 46. In tire 2, edge 48 is positioned on the axially inner side of apex 40.

Although not shown in the accompanying drawings, carcass ply 42 is made of numerous cords that are arrayed parallel to each other and of a topping rubber. The absolute value of the angle each cord makes to the equatorial plane is 75 to 90 degrees. In other words, carcass 16 has a radial structure. Cords are made of organic fiber. Preferred examples of organic fiber are polyethylene terephthalate fibers, nylon fibers, rayon fibers, polyethylene naphthalate fibers, aramid fibers, and polyketone fibers.

Load support layer 18 in FIG. 1 is positioned on the axially inner side of side wall 10. Support layer 18 is positioned on the axially inner side of carcass 16. The radial position of support layer 18 is between tread 16 and bead 14. Support layer 18 is sandwiched between carcass 16 and inner liner 24. Support layer 18 tapers off radially inward as well as radially outward. Support layer 18 is shaped like a crescent. Support layer 18 is made of a crosslinked rubber with high hardness. When the tire is deflated, support layer 18 supports the load. Because of support layer 18, tire 2 is capable of running for a certain duration even in a deflated state. Tire 2 is also referred to as a runflat tire. Tire 2 is a side-reinforced type. It is an option for tire 2 to have a support layer with a different shape from that of support layer 18 shown in FIG. 1.

Of carcass 16, the portion overlapping support layer 18 is separated from inner liner 24. In other words, carcass 16 is curved because of support layer 18. When tire 2 is deflated, a compressive load is exerted on support layer 18, and a tensile load is exerted in the region where carcass 16 is adjacent to support layer 18. Since support layer 18 is a rubber block, it is fully resistant to compressive loads.

Carcass 16 is provided with cords, and is capable of fully resisting tensile loads. Because of support layer 18 and cords of carcass 16, longitudinal deformation of tire 2 is suppressed when it is deflated. Tire 2 with suppressed longitudinal deformation exhibits excellent steering stability when it is deflated.

When complex modulus of elasticity (E*f) of the crosslinked rubber for support layer 18 is high in tire 2, longitudinal deformation is suppressed when tire 2 is deflated. Complex modulus of elasticity (E*f) of support layer 18 is preferred to be set at 5.0 MPa or higher, more preferably at 6.0 MPa or higher, and even more preferably at 7.2 MPa or higher. On the other hand, when complex modulus of elasticity (E*f) of the crosslinked rubber for support layer 18 is low in tire 2, riding comfort in a normal condition is excellent. From those viewpoints, complex modulus of elasticity (E*f) is preferred to be set at 13.5 MPa or lower, more preferably at 12.0 MPa or lower, and especially preferably at 10.5 MPa or lower.

Belt 20 is positioned on the radially inner side of tread 6. Belt 20 is laminated on carcass 16. Belt 20 reinforces carcass 16. Belt 20 is made up of inner layer 50 and outer layer 52. The width of inner layer 50 is slightly greater than that of outer layer 52. Although not shown in the accompanying drawings, inner layer 50 and outer layer 52 are each made of numerous cords arrayed parallel to each other and of a topping rubber. Each cord is inclined to the equatorial plane. The absolute value of the inclination angle is usually 10 degrees or greater and 35 degrees or smaller. The inclination direction to the equatorial plane of the cords in inner layer 50 is opposite the inclination direction to the equatorial plane of the cords in outer layer 52. Preferred material for the cords is steel. Alternatively, organic fiber may be used for the cords. Belt 20 may also have three or more layers.

Band 22 is made up of full band 54 and a pair of edge bands 56. Band 22 is positioned on the radially outer side of belt 20. The width of full band 54 in an axial direction is substantially the same as that of belt 20. Edge band 56 is positioned at an axial edge of belt 20. Edge band 56 covers the radially outer side of an axial edge of inner layer 50 and axial edge of outer layer 52. Although not shown in the accompanying drawings, full band 54 and edge bands 56 are each made of cords and a topping rubber. The cords are helically wound. Full band 54 and edge band 56 have a so-called jointless structure. Cords extend substantially in a circumferential direction. The angle of cords with respect to the circumferential direction is 5 degrees or smaller and may further be 2 degrees or smaller. Since belt 20 is bound by those cords, the lifting of belt 20 is suppressed. The cords are made of organic fiber. Preferred examples of organic fiber are nylon fibers, polyester fibers, rayon fibers, polyethylene naphthalate fibers, and aramid fibers.

Belt 20 and band 22 form the reinforcing layer. The reinforcing layer may be formed using only belt 20. The reinforcing layer may also be formed using only band 22.

Inner liner 24 is bonded to the inner surfaces of carcass 16 and support layer 18. Inner liner 24 is made of a crosslinked rubber. For inner liner 24, a rubber with excellent air shielding performance is used. Inner liner 24 retains the inflation pressure of tire 2.

Chafer 26 is positioned near bead 14. Chafer 26 extends radially inward from the axially inner side of core 38 and reaches bead toe (Bt). Chafer 26 extends axially outward from bead toe (Bt) along the radially inner side of core 38. Chafer 26 is laminated on core side portion (46*a*) of turn-up portion 46. In addition, chafer 26 is laminated on core laminating portion (46*b*) of turn-up portion 46. The end of chafer 26 is positioned on the radially outer side of core 38. Chafer 26 protects carcass ply 42 laminated around core 38.

When tire 2 is mounted on a rim, chafer 26 makes direct contact with the rim. The vicinity of bead 14 is protected by such contact. In the present embodiment, chafer 26 is made of fabric and rubber impregnated in the fabric. It is an option for chafer 26 to be integrated with clinch 12. In such a case, the same material as that for clinch 12 is also used for chafer 26.

In tire 2, the portion made up of sidewall 10 and clinch 12 is referred to as side portion 58. Side portion 58 extends from an end of tread 6 substantially inward in a radial direction. Bead 14 is positioned on the axially inner side of side portion 58. Side portion 58 is provided with rib 60. Rib 60 is formed to protrude in an axial direction.

When tire 2 is mounted on a rim, rib 60 is positioned on the axially outer side of the rim flange. Rib 60 protrudes axially outward from the edge of the flange. Rib 60 prevents damage to the rim flange.

On outer surface (10a) of sidewall 10 of tire 2, multiple dimples 62 are formed. Dimple 62 of tire 2 is formed as a recess in a substantially rectangular shape with a long side set in a circumferential direction. Dimples 62 are formed to be arrayed in circumferential and radial directions. Dimples 62 contribute radiation of heat from the sidewall. Instead of a rectangle, dimple 62 may be shaped as a circle or other polygon. Furthermore, instead of dimple 62 or along with dimple 62, a fin may also be formed.

Double-headed arrow (H1) in FIG. 2 indicates the height from bead base line (BL) to edge 48 of turn-up portion 46. In other words, height (H1) indicates the height of turn-up portion 46 from bead base line (BL). Height (H1) is measured as a straight distance in a radial direction. Double-headed arrow (W1) indicates the width in an axial direction where radially outer side surface (38b) of core 38 and turn-up portion 46 are laminated. Width (W1) is measured along radially outer side surface (38b) of core 38.

Figure 3:
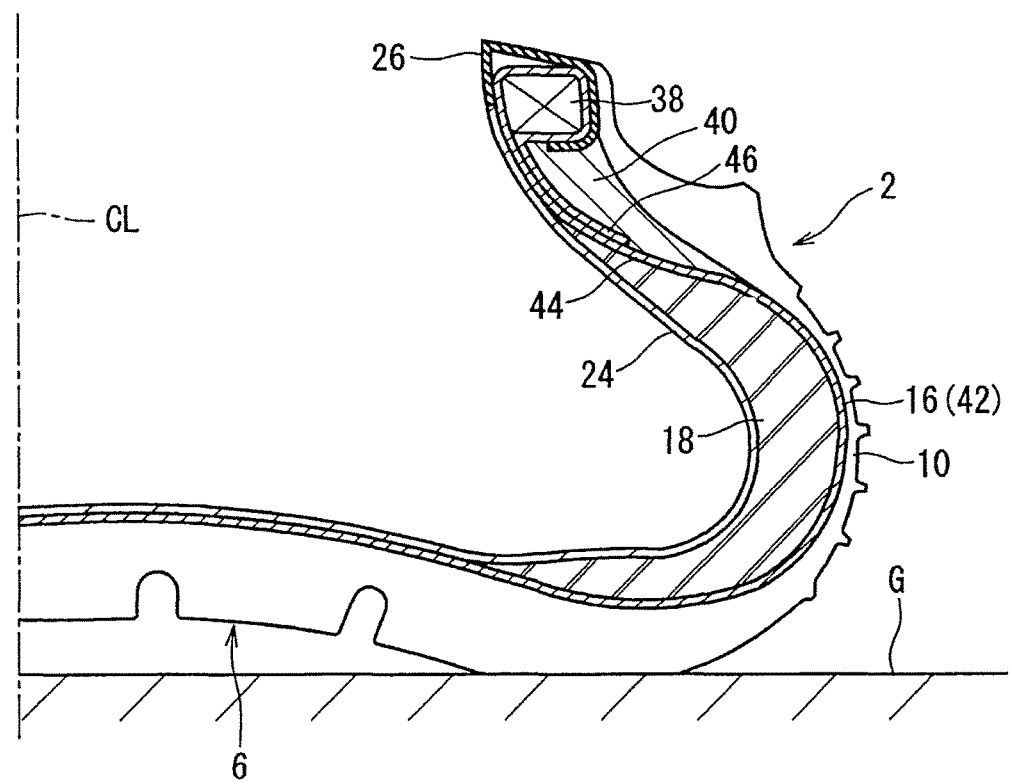
FIG. 3 is a view illustrating the tire in FIG. 1 in use.

FIG. 3 shows tire 2 running on road surface (G) in a deflated state. The radially center portion of support layer 18 is significantly bent. In the radially center portion of support layer 18, the axially inner side is subject to significant compressive deformation, and the axially outer side is subject to significant elongation deformation. The temperature of tire 2 rises as the support layer is repeatedly deformed. In tire 2, carcass 16 made of cords suppresses elongation deformation of support layer 18. Carcass 16 suppresses deformation of support layer 18. From the viewpoint of suppressing elongation deformation at high temperature, the cords of carcass 16 are preferred to be made of rayon fiber, aramid fiber or polyketone fiber.

In a state shown in FIG. 3, the axially outer side of apex 40 is subject to compressive deformation. The axially inner side of apex 40 is subject to elongation deformation. Carcass 16 has cords, and thus elongation deformation is suppressed. Main portion 44 and turn-up portion 46 of carcass 16 are positioned on the axially inner side of apex 40. Carcass 16 suppresses the elongation deformation of apex 40. Carcass 16 suppresses the deformation of apex 40. Compressive deformation is likely to cause damage and peeling in carcass 16. Since turn-up portion 46 is positioned on the axially inner side of apex 40, it is not affected greatly by compressive deformation. Damage and peeling are less likely to occur in carcass 16.

In apex 40, stress is concentrated in the vicinity at a predetermined height measured from the bead base line in a radial direction. The predetermined height where stress is concentrated is determined by the relationship with the rim flange. The height will not differ much even with a different tire size. In carcass 16 having turn-up edge 48 positioned in the portion where stress is the greatest, edge 48 of turn-up portion 46 tends to peel. To suppress peeling at edge 48, height (H1) is preferred to be 28 mm or less, more preferably 20 mm or less, especially preferably 10 mm or less. Also, from the same viewpoint, height (H1) is preferred to be 42 mm or greater, more preferably 50 mm or greater, and especially preferably 60 mm or greater.

In tire 2, clinch 12 is bonded to the radially outer side of apex 40. Apex 40 and clinch 12 are bonded together. If the complex modulus of elasticity (E*m) of the crosslinked rubber for apex 40 and the complex modulus of elasticity of (E*c) of the crosslinked rubber for the clinch differ significantly, damage is likely to occur originating at the boundary of apex 40 and clinch 12. The ratio (E*c/E*m) of complex modulus of elasticity (E*c) and complex modulus of elasticity (E*m) is preferred to be 0.55 or greater, more preferably 0.75 or greater, especially preferably 0.9 or greater. From the same viewpoint, the ratio (E*c/E*m) is preferred to be 1.25 or lower, more preferably 1.15 or lower, especially preferably 1.1 or lower.

Since dimples 62 are formed in tire 2, a-greater surface area is achieved on sidewall 10. A greater surface area facilitates heat radiation from tire 2 to atmospheric air. Dimples 62 cause air turbulence around tire 2. Because of the turbulence, more heat is radiated from tire 2 to atmospheric air. The temperature of tire 2 is less likely to rise. Damage to rubber members and peeling between rubber members caused by heat are suppressed in tire 2. Tire 2 with dimples 62 exhibits especially excellent durability.

In the embodiments of the present invention, the measurement of each member of tire 2 is obtained at a cross section of tire 2 shown in FIG. 1. In the present application, a normal rim indicates a rim regulated by the standards on which tire 2 is based. "Normal Rim" under JATMA regulations, "Design Rim" under TRA regulations, and "Measuring Rim" under ETRTO regulations are each a normal rim. In the present application, a normal inflation pressure indicates air pressure regulated by the standards on which tire 2 is based. "Maximum Air Pressure" under JATMA regulations, "Maximum Value Described in Tire Load Limits at Various Cold Inflation Pressures" under TRA regulations, and "Inflation Pressure" under ETRTO regulations are each a normal inflation pressure.

In the embodiments of the present invention, the complex modulus of elasticity is measured as it is regulated in "JIS K 6394." The measurement conditions are as follows.

Viscoelasticity spectrometer: "VESF-3," made by Iwamoto Seisakusho Co., Ltd.)
initial distortion: 10%
motion distortion: ±1%
frequency: 10 Hz
mode for deformation: tensile
temperature: 70° C.

Figure 4:
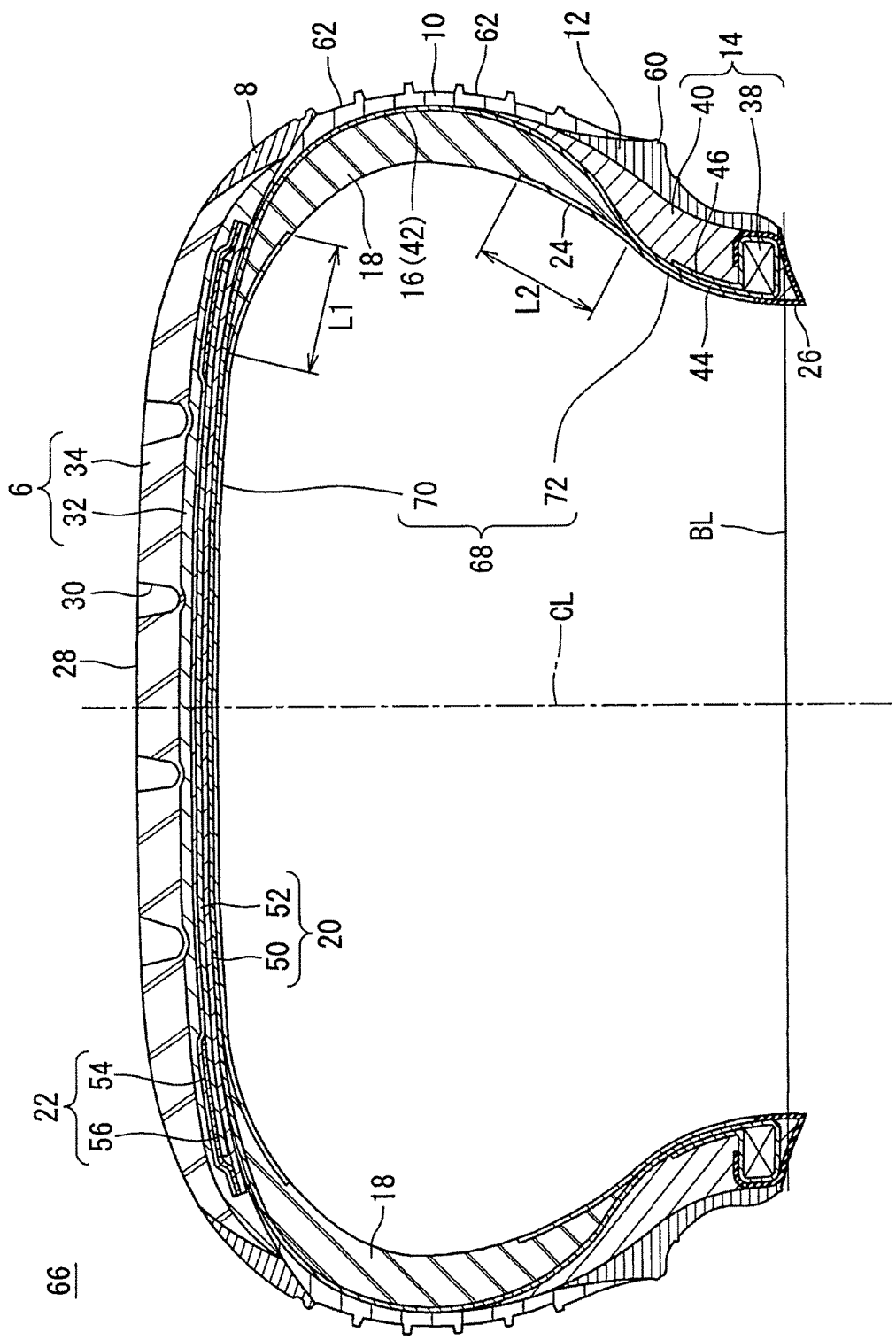
FIG. 4 is a cross-sectional view showing part of the pneumatic tire according to another embodiment of the present invention.

FIG. 4 shows pneumatic tire 66 according to another embodiment of the present invention. Tire 66 is provided with inner liner 68 instead of inner liner 24 of tire 2. The rest of the structure is the same as in tire 2. Thus, the description of the same structure is omitted here, and the structure different from tire 2 is described. Also, the same reference numeral is applied in describing a structure the same as or identical to that of tire 2.

Inner liner 68 is made up of center portion 70 and a pair of edge portions 72. Inner line 68 is divided into center portion 70 and edge portions 72. Center portion 70 is bonded to the radially outer side of the inner side surface of one of support layers 18 and to the radially outer side of the inner side surface of the other support layer 18. Paired edge portions 72 are each bonded to the radially inner side of the inner side surfaces of support layer 18 and are extended to their respective chafers 26. Center portion 70 and edge portion 72 are not contiguous on the inner surface of support layer 18. Inner liner 68 contributes to setting tire 2 to be lightweight and to reducing the longitudinal spring constant. Since tire 66 has support layer 18, sufficient air shielding effects are achieved even by using inner liner 68.

Double-headed arrow (L1)in FIG. 4 indicates the amount that support layer 18 and center portion 70 overlap. Double-headed arrow (L2) indicates the amount that support layer 18 and edge portion 72 overlap. Overlapping amounts (L1), (L2) are measured along the inner surface of support layer 18 in the cross section shown in FIG. 4. By setting sufficient overlapping amounts (L1), (L2), inner liner 68 and support layer 18 are integrated, thus suppressing an increase in the number of manufacturing steps. From such a viewpoint, overlapping amounts (L1), (L2) are each preferred to be 5 mm or greater, more preferably 7 mm or greater. On the other hand, from the viewpoints of lightweight tire 2 and a lower longitudinal spring constant, overlapping amounts (L1), (L2) are preferred to be 20 mm or less, more preferably 15 mm or less.

Also, the same as in tire 2 shown in FIG. 3, when tire 66 runs in a deflated state, significant compressive deformation occurs on the axially inner side of the radially center portion of support layer 18. The impact from the significant compressive deformation is mitigated on divided inner liner 68. Accordingly, damage or peeling of inner liner 68 is less likely to occur. Divided inner liner 68 also contributes to improving the durability of tire 66.

Figure 5:
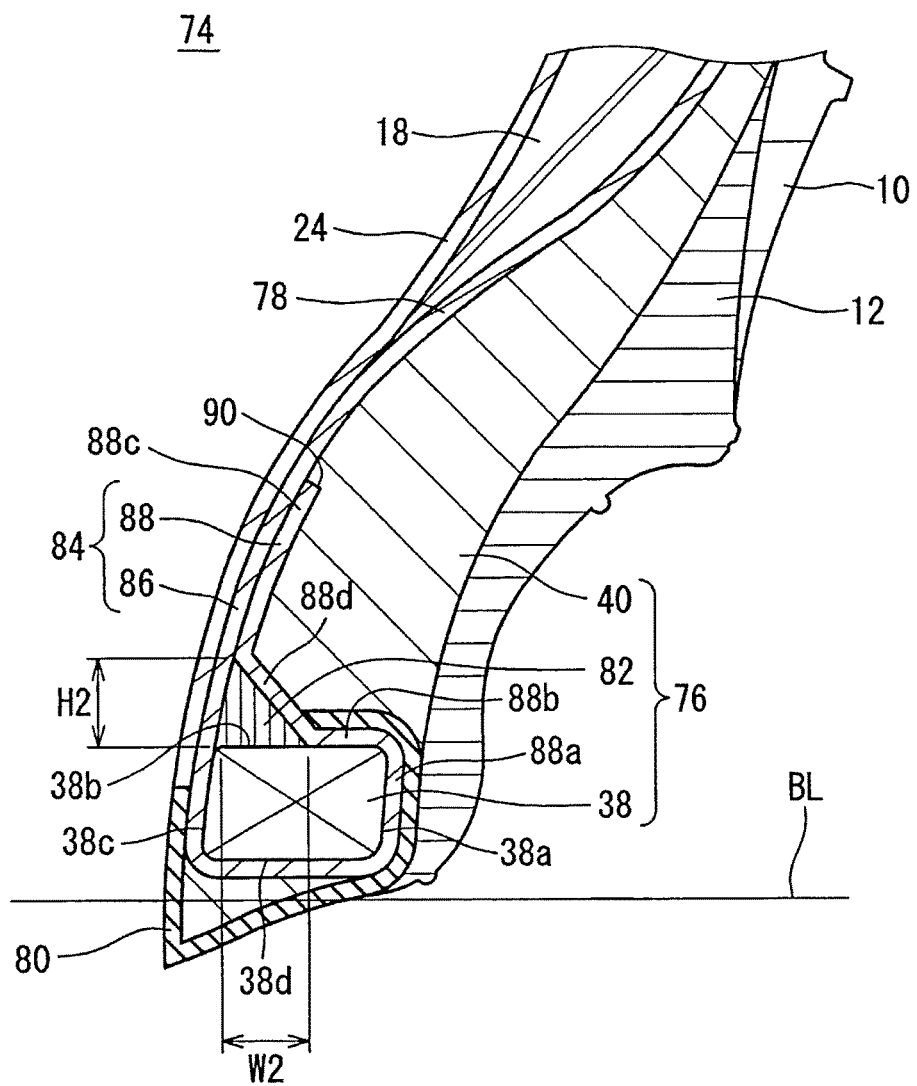
FIG. 5 is a cross-sectional view showing part of the pneumatic tire according to yet another embodiment of the present invention.

FIG. 5 shows part of tire 74 according to yet another embodiment of the present invention. Here, a description of the same structure as that in tire 2 is omitted, and a structure different from that in tire 2 will be described. The same reference numeral is applied in describing a structure the same as or identical to that of tire 2.

Tire 74 has bead 76, carcass 78 and chafer 80. Tire 74 has the same structure as tire 2 except that bead 76, carcass 78 and chafer 80 are different.

The same as in tire 2, bead 76 has core 38 and apex 40 as the main apex. Bead 76 further includes a secondary apex 82. Secondary apex 82 is positioned on the axially inner side of apex 40. Secondary apex 82 extends radially outward from core 38. Secondary apex 82 tapers off radially outward. Secondary apex 82 is made of a crosslinked rubber with high hardness.

Carcass 78 is made of carcass ply 84. Carcass ply 84 is bridged between beads 76 on both sides. Carcass ply 84 is formed along tread 6 and sidewall 10. Carcass ply 84 is turned up around core 38 from the inner side toward the outer side in an axial direction. Because of such a turn-up portion, main portion 86 and turn-up portion 88 are formed in carcass ply 84.

Turn-up portion 88 is turned up by being laminated from radially inner side surface (38d) toward axially outer side surface (38a) of core 38. Turn-up portion 88 is provided with core side portion (88a), core laminating portion (88b), ply laminating portion (88c) and apex laminating portion (88d). Core side portion (88a) is laminated on axially outer side surface (38a) of core 38. Core laminating portion (88b) is laminated on radially outer side surface (38b) of core 38. Ply laminating portion (88c) is laminated on main portion 86. Apex laminating portion (88d) is laminated on the axially outer side of secondary apex 82. In turn-up portion 88, core laminating portion (88b) is contiguous to core side portion (88a), apex laminating portion (88d) is contiguous to core laminating portion (88b), and ply laminating portion (88c) extends to be contiguous to apex laminating portion (88d). Edge 90 on the radially outer side of turn-up portion 88 overlaps main portion 86. In tire 74, edge 90 is positioned on the axially inner side of apex 40.

Chafer 80 is positioned near bead 76. Chafer 80 extends radially inward from the axially inner side of core 38 to reach bead toe (Bt). Chafer 80 extends axially outward from bead toe (Bt) along the radially inner side of core 38. Chafer 80 is laminated on core side portion (88a) of turn-up portion 88. Chafer 80 is laminated on core laminating portion (88b). The edge of chafer 80 is positioned on the radially outer side of core 38. Chafer 80 protects carcass ply 84 laminated around core 38.

As shown in FIG. 5, secondary apex 82 is surrounded by core 38, main portion 86 and turn-up portion 88. Of radially outer side surface (38b) of core 38, secondary apex 82 extends radially outward from the axially inner side of the portion where turn-up portion 88 is laminated. Double-headed arrow (W2) in FIG. 5 shows the distance for where secondary apex 82 and core 38 are laminated. Double-headed arrow (H2)shows the distance for where secondary apex 82 and main portion 86 are laminated. Distances (W2), (H2)are measured along the surface of secondary apex 82 shown in FIG. 5.

Because tire 74 has secondary apex 82, laminating carcass 78 at turn-up portion 88 is made easier. The manufacturing process is simplified by secondary apex 82. When a simplified manufacturing process is considered, secondary apex 82 is preferred to be formed. In other words, distance (W2) and distance (H2)are each preferred to be greater than zero. Moreover, the manufacturing process is even more simplified by setting distance (W2) and distance (H2)to be the same length. From those viewpoints, the ratio (W2)/(H2)of distance (W2) and distance (H2)is preferred to be 0.9 or greater and 1.1 or less.

On the other hand, to avoid damage and peeling of turn-up portion 88, distance (W2)) and distance (H2)are preferred to be smaller. Moreover, by setting distance (W2) and distance (H2)to be smaller, durability is enhanced. From those viewpoints, distance (W2) and distance (H2)are preferred to be 7 mm or less.

Figure 6:
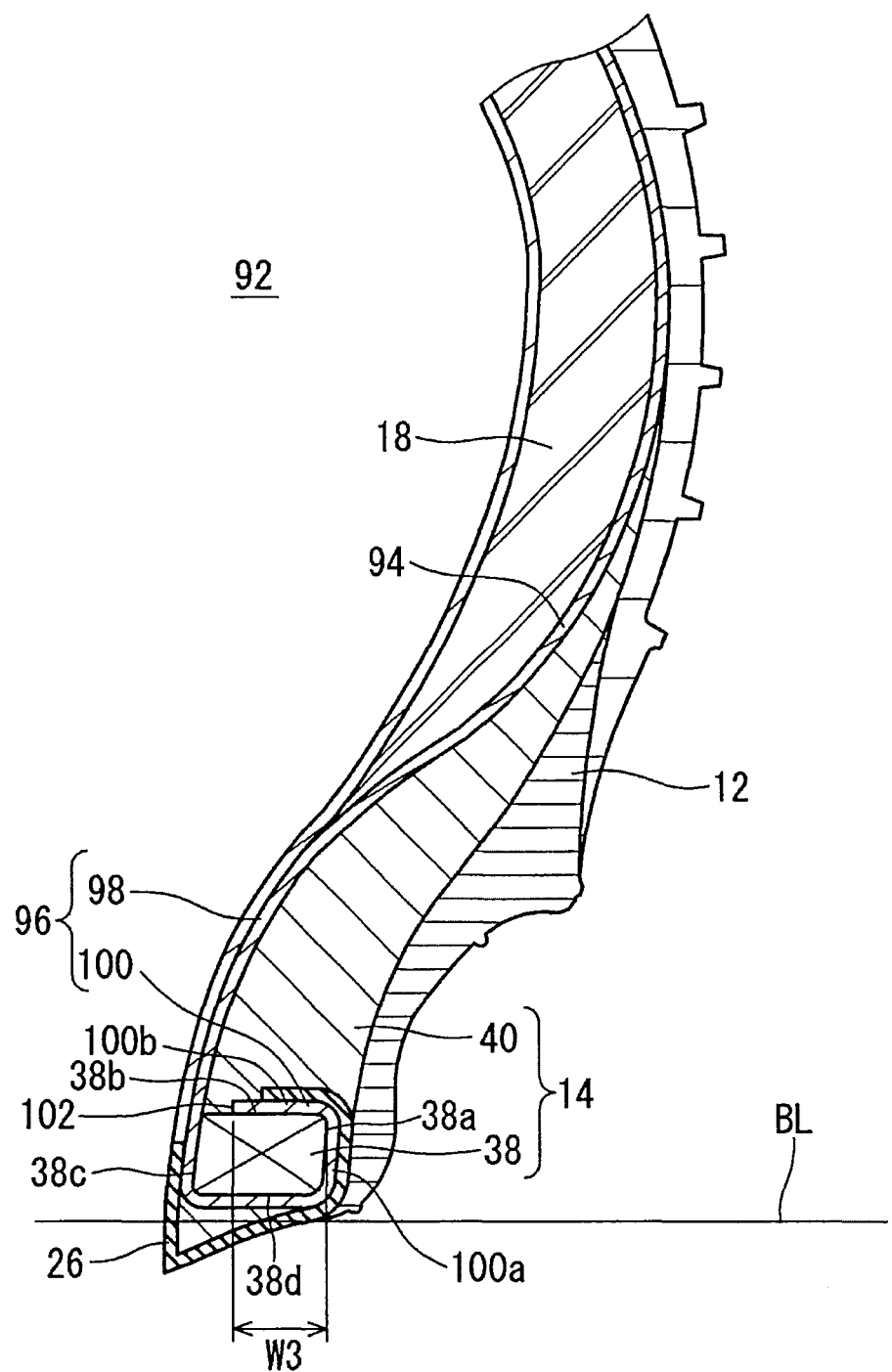
FIG. 6 is a cross-sectional view showing part of the pneumatic tire according to yet another embodiment of the present invention.

FIG. 6 shows part of pneumatic tire 92 according to yet another embodiment of the present invention. Here, a description of the same structure as that in tire 2 is omitted, and a structure different from that in tire 2 will be described. The same reference numeral is applied in describing a structure the same as or identical to that of tire 2.

Tire 92 has carcass 94 instead of carcass 16. The rest of tire 92 has the same structure as that of tire 2.

Carcass 94 is made of carcass ply 96. Carcass ply 96 bridges between beads 14 of both sides. Carcass ply 96 is turned up around core 38 from the inner side toward the outer side in an axial direction. Because of such a turn-up structure, main portion 98 and turn-up portion 100 are formed in carcass ply 96.

Turn-up portion 100 is turned up by being laminated from radially inner side surface (38d) of core 38 to axially outer side surface (38a). Turn-up portion 100 is provided with core side portion (100a) and core laminating portion (100b). Core side portion (100a) is laminated on axially outer side surface (38a) of core 38. Core laminating portion (100b) is laminated on radially outer side surface (38b) of core 38. Core laminating portion (100b) extends to be contiguous to core side portion (100a). Edge 102 of turn-up portion 100 is positioned on the radially outer side of core 38.

Double-headed arrow ((W3)) in FIG. 6 shows the distance where turn-up portion 100 and radially outer side surface (38b) of core 38 are laminated in an axial direction. Distance ((W3)) is measured along radially outer side surface (38b) of core 38 in a cross section shown in FIG. 6.

When tire 92 runs in a deflated state, compressive deformation occurs in the axially outer side of apex 40. Since edge 102 of turn-up portion 100 is positioned on the radially outer side of core 38, damage and peeling are suppressed in turn-up portion 100. Also, since edge 102 of turn-up portion 100 is positioned on the radially outer side of core 38, carcass ply 96 is securely bridged between a pair of cores 38. Accordingly, when tire 92 is formed and inflated, turn-up portion 100 is suppressed from peeling off from core 38.

Tire 92 with greater distance (W3) is securely suppressed from peeling at turn-up portion 100 while tire 92 is inflated. From such a viewpoint, distance (W3) is preferred to be 6 mm or greater, more preferably 8 mm or greater.

EXAMPLES

In the following, the effects according to an embodiment of the present invention are made clear according to examples. However, an understanding of the present invention should not be limited to a description based on those examples.

Example 1

A pneumatic tire (runflat tire) for Example 1 was obtained having the basic structure shown in FIGS. 1 and 2. The tire size was 235/55R18. As shown in FIG. 1, dimples were formed on the sidewall of the tire. Height (H1) from bead base line (BL) to the edge of the turn-up portion of the carcass ply, complex modulus of elasticity (E*m) of the main apex, complex modulus of elasticity (E*c) of the clinch, complex modulus of elasticity (E*f) of the support layer (the load support layer), and the ratio of complex moduli of elasticity (E*c)/(E*m) were as shown in Table 1. To evaluate the tire, a rim with a nominal width of "7J" was used.

Comparative Example 1

A conventional runflat tire is prepared for Comparative Example 1. Although not shown in the accompanying drawing, the turn-up portion of the carcass ply is turned up along the axially outer side of the apex of the tire. The tire has a so-called "super-high turn-up structure," where the turn-up portion overlaps the belt. The tire had the same structure as the tire in Example 1 except that the carcass and chafer were different.

Example 2

The tire was prepared the same as in Example 1 except that no dimples were provided in the sidewall.

Example 3

The tire was prepared to have the basic structure shown in FIG. 4 except that no dimples were provided in the sidewall. The tire had the same structure as that in Example 2 except that it had a divided inner liner.

Examples 4 to 8

Tires were each prepared the same as in Example 2 except that height (H1) was set as shown in Table 2. In the tire of Example 4, the turn-up portion of the carcass ply overlapped the belt.

Examples 9 to 13

Tires were each prepared to have the basic structure shown in FIG. 5 except that no dimples were provided in the sidewall. In those tires, complex modulus of elasticity (E*s) of the secondary apex, distance (W2) for where the secondary apex and the radially outer side surface of the core were laminated, and distance (H2) for where the secondary apex and the main portion were laminated were respectively set as shown in Table 3.

Examples 14 to 16

Tires were each prepared to have the basic structure shown in FIG. 6 except that no dimples were provided in the sidewall. In those tires, distance (W3) for where the turn-up portion of the carcass ply and the radially outer side surface of the core were laminated in an axial direction was respectively set as shown in Table 4.

Examples 17 to 20

Tires were each prepared the same as in Example 2 except that their respective complex modulus of elasticity (E*c) of the clinch was set as shown in Table 5.

Examples 21 to 24

Tires were each prepared the same as in Example 2 except that their respective complex modulus of elasticity (E*f) of the support layer was set as shown in Table 6.
Evaluation of Longitudinal Rigidity The longitudinal spring constant of each tire was measured under the following conditions.
rim: normal rim
inflation pressure: 200 kPa
load: 80% of the maximum load set by JATMA The results are shown in Tables 1 to 6 below as index values by setting the result obtained in comparative example 1 at 100. The smaller the index value, the smaller the longitudinal spring constant. More preferred results are indicated by smaller index values.
Evaluation of Tire Mass The tire mass was measured. The results are shown in Tables 1 to 6 as index values by setting the result obtained in comparative example 1 at 0. The smaller the index value, the smaller the mass. More preferred results are indicated by smaller index values.
Evaluation of (Runflat) Durability Durability when a tire is deflated and its inflation pressure is lowered was evaluated as follows. A tire was mounted on a normal rim, and air was filled. The tire was equipped on a drum-running tester and a longitudinal load of 5.2 kN was exerted on the tire. Then, a deflated state was created based on the inflation pressure set as a normal pressure. The tire was run on a drum with a radius of 1.7 m at a speed of 80 km/h, recording the distance the tire ran until abnormal noise was observed. The results are shown in Tables 1 to 6 as index values by setting the result obtained in comparative example 1 as 100. More preferred results are indicated by greater index values. "Support layer" in the column "damage" indicates damage to the load support layer. In the same manner, "ply looseness" indicates damage caused by peeled carcass ply, and "interface" indicates damage at a boundary between rubber members.

Evaluation of Productivity

Time required for producing a tire was measured. Also, the ratio of defects was calculated. Based on the production time of the tire and defect ratio, the production time per good tire was calculated. Productivity was evaluated based on the inverse number of production time per good tire. The results are shown in Tables 1 to 6 as index values by setting the result obtained in comparative example 1 as 100.

Excellence in productivity is indicated by greater index values.

TABLE 1

| | Evaluation results | | | |
|---|---|---|---|---|
| | comparative example 1 | example 1 | example 2 | example 3 |
| basic structure | — | FIG. 1 | FIG. 1 | FIG. 4 |
| dimple | no | yes | no | no |
| height H1 (mm) | 109 | 23 | 23 | 23 |
| E*m of main apex (MPa) | 11.0 | 11.0 | 11.0 | 11.0 |
| E*c of clinch (MPa) | 8.1 | 8.1 | 8.1 | 8.1 |
| E*f of support layer (MPa) | 10.5 | 10.5 | 10.5 | 10.5 |
| ratio E*c/E*m (%) | 74 | 74 | 74 | 74 |
| longitudinal spring constant | 100 | 94 | 94 | 93 |
| mass | 0 | −0.08 | −0.29 | −0.73 |
| durability | 100 | 260 | 180 | 190 |
| damage | | ply looseness | support layer | support layer |
| productivity | 100 | 97 | 97 | 97 |

TABLE 2

| | Evaluation results | | | | |
|---|---|---|---|---|---|
| | example 4 | example 5 | example 6 | example 7 | example 8 |
| basic structure | FIG. 1 | FIG. 1 | FIG. 1 | FIG. 1 | FIG. 1 |
| dimple | no | no | no | no | no |
| height H1 (mm) | 109 | 75 | 42 | 35 | 28 |
| E*m of main apex (MPa) | 11.0 | 11.0 | 11.0 | 11.0 | 11.0 |
| E*c of clinch (MPa) | 8.1 | 8.1 | 8.1 | 8.1 | 8.1 |
| E*f of support layer (MPa) | 10.5 | 10.5 | 10.5 | 10.5 | 10.5 |
| ratio E*c/E*m (%) | 74 | 74 | 74 | 74 | 74 |
| longitudinal spring constant | 96 | 95 | 95 | 94 | 94 |
| mass | 0.0 | −0.20 | −0.25 | −0.27 | −0.28 |
| durability | 200 | 190 | 190 | 120 | 180 |
| damage | support layer | support layer | support layer | ply looseness | support layer |
| productivity | 95 | 96 | 96 | 96 | 96 |

TABLE 3

| | Evaluation results | | | | |
|---|---|---|---|---|---|
| | example 9 | example 10 | example 11 | example 12 | example 13 |
| basic structure | FIG. 5 | FIG. 5 | FIG. 5 | FIG. 5 | FIG. 5 |
| dimple | no | no | no | no | no |

TABLE 3-continued

| | Evaluation results | | | | |
|---|---|---|---|---|---|
| | example 9 | example 10 | example 11 | example 12 | example 13 |
| height H1 (mm) | 23 | 23 | 23 | 23 | 23 |
| distance W2 (mm) | 7 | 7 | 7 | 4 | 8 |
| distance H2 (mm) | 7 | 7 | 7 | 4 | 8 |
| E*m of main apex (MPa) | 11.0 | 11.0 | 11.0 | 11.0 | 11.0 |
| E*s of secondary apex (MPa) | 14.5 | 11.0 | 8.1 | 11.0 | 11.0 |
| E*c of clinch (MPa) | 8.1 | 8.1 | 8.1 | 8.1 | 8.1 |
| E*f of support layer (MPa) | 10.5 | 10.5 | 10.5 | 10.5 | 10.5 |
| ratio E*c/E*m (%) | 74 | 74 | 74 | 74 | 74 |
| longitudinal spring constant | 94 | 94 | 94 | 95 | 95 |
| mass | −0.29 | −0.29 | −0.29 | −0.31 | −0.27 |
| durability | 180 | 180 | 180 | 190 | 170 |
| damage | support layer | support layer | support layer | support layer | support layer |
| productivity | 98 | 99 | 98 | 99 | 99 |

TABLE 4

| | Evaluation results | | |
|---|---|---|---|
| | example 14 | example 15 | example 16 |
| basic structure | FIG. 6 | FIG. 6 | FIG. 6 |
| dimple | no | no | no |
| distance W3 (mm) | 8 | 6 | 3 |
| E*m of main apex (MPa) | 11.0 | 11.0 | 11.0 |
| E*c of clinch (MPa) | 8.1 | 8.1 | 8.1 |
| E*f of support layer (MPa) | 10.5 | 10.5 | 10.5 |
| ratio E*c/E*m (%) | 74 | 74 | 74 |
| longitudinal spring constant | 93 | 93 | 93 |
| Mass | −0.33 | −0.32 | −0.31 |
| Durability | 175 | 175 | 175 |
| damage | support layer | support layer | support layer |
| Productivity | 99 | 99 | 25 |

TABLE 5

| | Evaluation results | | | |
|---|---|---|---|---|
| | example 17 | example 18 | example 19 | example 20 |
| basic structure | FIG. 1 | FIG. 1 | FIG. 1 | FIG. 1 |
| Dimple | no | no | no | no |
| height H1 (mm) | 23 | 23 | 23 | 23 |
| E*m of main apex (MPa) | 11.0 | 11.0 | 11.0 | 11.0 |
| E*c of clinch (MPa) | 4.2 | 6.0 | 13.8 | 16.2 |
| E*f of support layer (MPa) | 10.5 | 10.5 | 10.5 | 10.5 |
| ratio E*c/E*m (%) | 38 | 55 | 125 | 147 |
| longitudinal spring constant | 91 | 93 | 96 | 98 |
| Mass | −0.29 | −0.29 | −0.29 | −0.29 |
| Durability | 120 | 170 | 185 | 120 |
| damage | interface | support layer | support layer | interface |
| Productivity | 97 | 97 | 97 | 97 |

TABLE 6

| | Evaluation results | | | |
|---|---|---|---|---|
| | example 21 | example 22 | example 23 | example 24 |
| basic structure | FIG. 1 | FIG. 1 | FIG. 1 | FIG. 1 |
| Dimple | no | no | no | no |

TABLE 6-continued

Evaluation results

|  | example 21 | example 22 | example 23 | example 24 |
|---|---|---|---|---|
| height H1 (mm) | 23 | 23 | 23 | 23 |
| E*m of main apex (MPa) | 11.0 | 11.0 | 11.0 | 11.0 |
| E*c of clinch (MPa) | 8.1 | 8.1 | 8.1 | 8.1 |
| E*f of support layer (MPa) | 3.0 | 5.0 | 13.5 | 17.0 |
| ratio E*c/E*m (%) | 74 | 74 | 74 | 74 |
| longitudinal spring constant | 88 | 91 | 96 | 99 |
| Mass | −0.29 | −0.29 | −0.29 | −0.29 |
| Durability | 130 | 165 | 200 | 210 |
| damage | interface | support layer | support layer | support layer |
| Productivity | 97 | 97 | 97 | 97 |

As shown in Tables 1 to 6, the tires of the examples have higher evaluation values than the tire of the comparative example. From the evaluation results, the excellence according to an embodiment of the present invention is clear.

A runflat tire may have a load support layer provided inside a sidewall. A crosslinked rubber with high hardness may be used for such a support layer. The runflat tire is referred to as a side-reinforced type. When such a type of runflat tire is deflated and the inner pressure is reduced, the support layer supports the load. The support layer suppresses deformation of the tire when it is deflated. Even if a deflated tire is kept running, generation of heat at the support layer is suppressed by the crosslinked rubber with high hardness. The runflat tire is capable of running for a certain duration even when it is deflated. A vehicle equipped with such runflat tires does not need to carry a spare tire regularly. When using runflat tires, changing a tire in inconvenient locations is avoidable.

When continuing to run on a deflated runflat tire, the support layer is repeatedly deformed and restored. Such repetition damages the rubber members of the tire and causes peeling between rubber members. When continuing to run on a deflated runflat tire, ply looseness may occur between a bead apex and a carcass ply in the runflat tire.

A runflat tire has a load support layer and its sidewall has great hardness. The tire has a high longitudinal spring constant. Moreover, in a tire provided with a carcass having a so-called "super-high turn-up structure," such a carcass further increases the longitudinal spring constant of the tire, and the tire tends to have low degree of riding comfort.

The longitudinal spring constant may be made lower. A reinforcing filler layer suppresses riding comfort from decreasing while enhancing the durability of the tire. However, when the deflated tire runs, compressive stress is generated in the carcass ply on the axially outer side of the bead apex, and the compressive stress may likely cause damage and peeling in the carcass ply. The reinforcing filler layer is not capable of fully suppressing damage and peeling in the carcass ply. Even more improved durability is required of the tire.

A runflat tire according to an embodiment of the present invention is excellent in durability as well as in riding comfort.

A pneumatic tire according to an embodiment of the present invention has the following: a tread whose outer surface forms the tread surface; a pair of sidewalls each extending from an edge of the tread substantially inward in a radial direction; a pair of clinches each extending from an edge of a sidewall substantially inward in a radial direction; a pair of beads each positioned on the axially inner side of a clinch; a carcass bridging one bead and the other bead along the inner side of the tread and sidewalls; and a pair of load support layers each positioned on the axially inner side of a carcass and between the tread and a bead. The bead has a core and a main apex. The core has a radially outer side surface facing radially outward. The carcass is made of a carcass ply. The carcass ply is turned up around the core from the axially inner side toward the outer side. Because of the turn-up, the main portion and the turn-up portion are formed in the carcass ply. The turn-up portion has a core laminating portion that is laminated on the radially outer side surface of the core. The main apex extends radially outward from the radially outer side of the core laminating portion.

It is preferred that the turn-up portion be laminated on the axially outer side of the main portion, and that height (H1) of the turn-up portion measured from the bead base line in a radial direction be 28 mm or less.

It is preferred that the turn-up portion be laminated on the axially outer side of the main portion, and that height (H1) of the turn-up portion measured from the bead base line in a radial direction be 42 mm or greater.

It is preferred to be set as follows: the bead has a secondary apex; the secondary apex is formed to be surrounded by the core, the main portion and the turn-up portion; the secondary apex is positioned on the axially inner side of the core laminating portion of the turn-up portion; the secondary apex extends radially outward from the core; distance (W2) for where the secondary apex and the radially outer side surface of the core are laminated is greater than zero and 7 mm or less; and distance (H2) for where the secondary apex and the main portion are laminated is greater than zero and 7 mm or less.

Regarding distance (W2) for where the secondary apex and the radially outer side surface of the core are laminated, and distance (H2) for where the secondary apex and the main portion are laminated, the ratio W2/H2 is preferred to be 0.9 or greater and 1.1 or lower.

The edge of the turn-up portion is preferred to be positioned on the radially outer side surface of the core. Distance (W3) for where the turn-up portion and the radially outer side surface of the core are laminated in an axial direction is 6 mm or greater.

Complex modulus of elasticity (E*s) of the crosslinked rubber for the secondary apex is preferred to be set the same as complex modulus of elasticity (E*m) of the crosslinked rubber for the main apex.

Regarding complex modulus of elasticity (E*c) of the crosslinked rubber for clinch and complex modulus of elasticity (E*m) of the crosslinked rubber for the main apex, the ratio (E*c)/(E*m) is preferred to be 0.55 or greater and 1.25 or lower.

Complex modulus of elasticity (E*f) of the crosslinked rubber for the load support layer is preferred to be 5.0 MPa or higher and 13.5 MPa or lower.

A runflat tire according to an embodiment of the present invention exhibits excellent durability and suppresses riding comfort from decreasing.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
   a tread;
   a plurality of sidewalls extending from edges of the tread substantially inward in a radial direction of the pneumatic tire, respectively;
   a plurality of clinches extending from edges of the sidewall substantially inward in the radial direction, respectively;
   a plurality of beads positioned on an axially inner side of the clinches, respectively;
   a carcass bridging the beads along an inner side of the tread and sidewalls;
   a plurality of load support layers positioned on an axially inner side of the carcass such that the load support layers are positioned between the tread and the beads; and
   a plurality of chafers formed at end portions of the beads respectively such that the plurality of chafers is configured to make contact with a rim,
   wherein each of the beads comprises a core and a main apex, the core comprises a radially outer side surface facing radially outward, the carcass comprises a carcass ply which is turned up around the core from an inner side toward an outer side in an axial direction of the pneumatic tire such that a main portion and a turn-up portion are formed in the carcass ply, the turn-up portion has a core laminating portion laminated on the radially outer side surface of the core, the main apex is extending radially outward from a radially outer side of the core laminating portion, and each of chafers has a laminated portion laminated on the core laminating portion of the turn-up portion in the carcass ply such that the laminated portion of each chafer is interposed between the main apex and the core laminating portion of the turn-up portion.

2. The pneumatic tire according to claim 1, wherein the turn-up portion is laminated on the axially outer side of the main portion, and the turn-up portion has a height H1 set in a range of 28 mm or less measured from a bead base line in the radial direction.

3. The pneumatic tire according to claim 2, wherein each of the beads comprises a secondary apex surrounded by the core, the main portion and the turn-up portion, positioned on the axially inner side of the core laminating portion of the turn-up portion, and extending radially outward from the core, the secondary apex has a distance W2 set in a range of greater than zero and 7 mm or less, where the distance W2 represents a distance for where the secondary apex and the radially outer side surface of the core are laminated, and the secondary apex has a distance H2 set in a range of greater than zero and 7 mm or less, where the distance H2 represents a distance for where the secondary apex and the main portion are laminated.

4. The pneumatic tire according to claim 2, wherein the clinches and the main apex satisfy a ratio $E*c/E*m$ set in a range of 0.55 or greater and 1.25 or lower, where $E*c$ represents a complex modulus of elasticity $E*c$ of a crosslinked rubber of the clinches, and $E*m$ represents a complex modulus of elasticity of a crosslinked rubber of the main apex.

5. The pneumatic tire according to claim 2, wherein the load support layer comprises a crosslinked rubber having a complex modulus of elasticity $E*f$ set in a range of 5.0 MPa or higher and 13.5 MPa or lower.

6. The pneumatic tire according to claim 1, wherein the turn-up portion is laminated on the axially outer side of the main portion, and the turn-up portion has a height H1 set in a range of 42 mm or greater measured from a bead base line in the radial direction.

7. The pneumatic tire according to claim 6, wherein each of the beads comprises a secondary apex surrounded by the core, the main portion and the turn-up portion, positioned on the axially inner side of the core laminating portion of the turn-up portion, and extending radially outward from the core, the secondary apex has a distance W2 set in a range of greater than zero and 7 mm or less, where the distance W2 represents a distance for where the secondary apex and the radially outer side surface of the core are laminated, and the secondary apex has a distance H2 set in a range of greater than zero and 7 mm or less, where the distance H2 represents a distance for where the secondary apex and the main portion are laminated.

8. The pneumatic tire according to claim 6, wherein the clinches , wherein the clinches and the main apex satisfy a ratio $E*c/E*m$ set in a range of 0.55 or greater and 1.25 or lower, where $E*c$ represents a complex modulus of elasticity $E*c$ of a crosslinked rubber of the clinches, and $E*m$ represents a complex modulus of elasticity of a crosslinked rubber of the main apex.

9. The pneumatic tire according to claim 6, wherein the load support layer comprises a crosslinked rubber having a complex modulus of elasticity $E*f$ set in a range of 5.0 MPa or higher and 13.5 MPa or lower.

10. The pneumatic tire according to claim 1, wherein each of the beads comprises a secondary apex surrounded by the core, the main portion and the turn-up portion, positioned on the axially inner side of the core laminating portion of the turn-up portion, and extending radially outward from the core, the secondary apex has a distance W2 set in a range of greater than zero and 7 mm or less, where the distance W2 represents a distance for where the secondary apex and the radially outer side surface of the core are laminated, and the secondary apex has a distance H2 set in a range of greater than zero and 7 mm or less, there the distance H2 represents a distance for where the secondary apex and the main portion are laminated.

11. The pneumatic tire according to claim 10, wherein the secondary apex satisfies a ratio W2/H2 set in a range of 0.9 or greater and 1.1 or lower, where W2 represents the distance W2 and H2 represents the distance H2.

12. The pneumatic tire according to claim 11, wherein the secondary apex comprises a crosslinked rubber having a complex modulus of elasticity $E*s$ set equal to a complex modulus of elasticity $E*m$ of a crosslinked rubber of the main apex.

13. The pneumatic tire according to claim 11, wherein the clinches and the main apex satisfy a ratio $E*c/E*m$ set n a range of 0.55 or greater and 1.25 or lower, where $E*c$ represents a complex modulus of elasticity $E*c$ of a crosslinked rubber of the clinches, and $E*m$ represents a complex modulus of elasticity of a crosslinked rubber of the main apex.

14. The pneumatic tire according to claim 11, wherein the load support layer comprises a crosslinked rubber having a complex modulus of elasticity $E*f$ set in a range of 5.0 MPa or higher and 13.5 MPa or lower.

15. The pneumatic tire according to claim 10, wherein the secondary apex comprises a crosslinked rubber having a complex modulus of elasticity $E*s$ set equal to a complex modulus of elasticity $E*m$ of a crosslinked rubber of the main apex.

16. The pneumatic tire according to claim 10, wherein the clinches and the main apex satisfy a ratio $E*c/E*m$ set n a range of 0.55 or greater and 1.25 or lower, where $E^*c$ represents a complex modulus of elasticity $E^*c$ of a crosslinked rubber of the clinches, and $E^*m$ represents a complex modulus of elasticity of a crosslinked rubber of the main apex.

17. The pneumatic tire according to claim 10, wherein the load support layer comprises a crosslinked rubber having a complex modulus of elasticity $E^*f$ set in a range of 5.0 MPa or higher and 13.5 MPa or lower.

18. The pneumatic tire according to claim 1, wherein the turn-up portion has an edge positioned on the radially outer side surface of the core, and the turn-up portion has a distance W3 set in a range of 6 mm or greater, where the distance W3 is a distance for where the turn-up portion and the radially outer side surface of the core are laminated.

19. The pneumatic tire according to claim 1, wherein the clinches and the main apex satisfy a ratio $E^*c/E^*m$ set in a range of 0.55 or greater and 1.25 or lower, where $E^*c$ represents a complex modulus of elasticity $E^*c$ of a crosslinked rubber of the clinches, and $E^*m$ represents a complex modulus of elasticity of a crosslinked rubber of the main apex.

20. The pneumatic tire according to claim 1, wherein the load support layer comprises a crosslinked rubber having a complex modulus of elasticity $E^*f$ set in a range of 5.0 MPa or higher and 13.5 MPa or lower.

* * * * *